United States Patent
Chang

(10) Patent No.: US 7,285,934 B2
(45) Date of Patent: Oct. 23, 2007

(54) COMBINATION OF POWER SUPPLY AND DETACHABLE ELECTRIC IMPLEMENT

(76) Inventor: Richard Chang, 4th Fl., No. 276, Sec. 1, Ta Tung Rd., Hsi Chih Town, Taipei Hsien (TW)

(*) Notice: Subject to any disclaimer, the term of this patent is extended or adjusted under 35 U.S.C. 154(b) by 0 days.

(21) Appl. No.: 10/841,640

(22) Filed: May 10, 2004

(65) Prior Publication Data

US 2004/0257035 A1    Dec. 23, 2004

(30) Foreign Application Priority Data

Jun. 20, 2003   (TW) .................................. 92116808

(51) Int. Cl.
*H01M 10/46* (2006.01)
(52) U.S. Cl. ..................................... 320/107; 320/115
(58) Field of Classification Search ................ 320/107, 320/112, 113, 117, 115

See application file for complete search history.

(56) References Cited

U.S. PATENT DOCUMENTS

| | | | | |
|---|---|---|---|---|
| 4,050,003 A | * | 9/1977 | Owings et al. ............. | 320/113 |
| 6,135,714 A | * | 10/2000 | Hsu ............................ | 416/63 |
| 6,501,246 B2 | * | 12/2002 | You et al. ................... | 320/114 |
| 6,515,451 B2 | * | 2/2003 | Watson et al. .............. | 320/117 |
| 6,741,064 B2 | * | 5/2004 | Liu et al. .................... | 320/107 |

* cited by examiner

*Primary Examiner*—Edward H Tso
(74) *Attorney, Agent, or Firm*—Bacon & Thomas, PLLC

(57) ABSTRACT

A combination of a power supply and a detachable electric implement is constructed to include a housing holding a power pack, a first coupling device fixedly located on the housing, an electric implement, which can be an electric sealing apparatus, electric fan, flash light, or any of a variety of small handheld electric apparatuses, and a second coupling device fixedly located on the electric implement for fastening to the first coupling device to secure the electric implement to the housing for enabling the electric implement to obtain the necessary working electric power from the power pack.

10 Claims, 5 Drawing Sheets

COMBINATION OF POWER SUPPLY AND DETACHABLE ELECTRIC IMPLEMENT

BACKGROUND OF THE INVENTION

1. Field of the Invention

The present invention relates to a power supply module for an electric implement and, more specifically, to a combination of a power supply and a detachable electric implement that enables any of a variety of small electric apparatuses to be detachably connected to a power pack for convenient use.

2. Description of Related Art

Various small electric implements are commercially available. These small electric implements, such as a flash light, laser pointer, mini fan, electric screwdriver, electric incense burner, radio, etc. are convenient for carrying by the user for use when desired.

The aforesaid small electric implements have different shapes, and are formed integral with a respective power pack. For example, a flash light has a cylindrical housing with a bulb disposed at one end and one or a set of battery cells connected in series in the cylindrical housing. Another example is a mini fan that has a handle, a meshed guard at one end of the handle, a fan blade module mounted inside the meshed guard, and one or a set of battery cells mounted inside the handle to provide the necessary working electric power to the fan blade module.

According to the aforesaid small electric implements, the power pack is not detachable, i.e., the power supply unit of a small electric implement cannot be detached from the small electric implement for use with another small electric implement.

SUMMARY OF THE INVENTION

The present invention has been accomplished under the circumstances in view. It is therefore the main object of the present invention to provide a combination of a power supply and a detachable electric implement, which enables any of a variety of small electric apparatuses to be detachably connected to a power pack for convenient use.

To achieve this and other objects of the present invention, the combination of power supply and detachable electric implement is comprised of a housing, a power pack, first coupling means, an electric implement, and second coupling means. The housing defines a receiving chamber. The power pack has power terminal means that is exposed to the outside of the housing. The first coupling means is fixedly located on the housing. The electric implement has power terminal means connectable to the power terminal means of the power pack to obtain the necessary working electric power from the power pack. The second coupling means is fixedly located on the electric implement for fastening to the first coupling means to secure the electric implement to the housing and to keep the power terminal means of the electric implement in contact with the power terminal means of the housing.

By means of the first and second coupling means, the electric implement can be connected to the housing and then detached from the housing. Therefore, by means of the first and second coupling means, different electric implements can be selectively fastened to the housing to obtain the necessary working electric power from the power pack in the housing.

According to one embodiment of the present invention, the first coupling means is comprised of a plurality of hooks formed integral with the housing, and the second coupling means is comprised of a plurality of hook holes formed in the electric element and adapted to receive the hooks. The positions of the first coupling means and second coupling means may be exchanged. Alternatively, the first coupling means and the second coupling means can be a dovetail groove and a dovetail tongue, forming a dovetail joint. Also the first and second coupling means can be a coupling neck and a coupling hole.

The aforesaid power pack can be a battery case, or a transformer. When a transformer is used for the power pack, it is connected to an external power source, for example, an AC power supply. Further, the electric implement can be a small light means, for example, a flash light, mini lamp, LED flashing light assembly, or laser pointer. Alternatively, the electric implement can be a small wind-force tool such as a mini fan or mini vacuum cleaner, a small motor-force tool such as an electric saw or electric screw driver, a small thermal hand tool such as an electric incense burner, electric foam cutter, electric sealing apparatus, an electric device such as a radio, speaker, microphone, a power adapter having multiple power jacks, or a cellular telephone, and so on.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
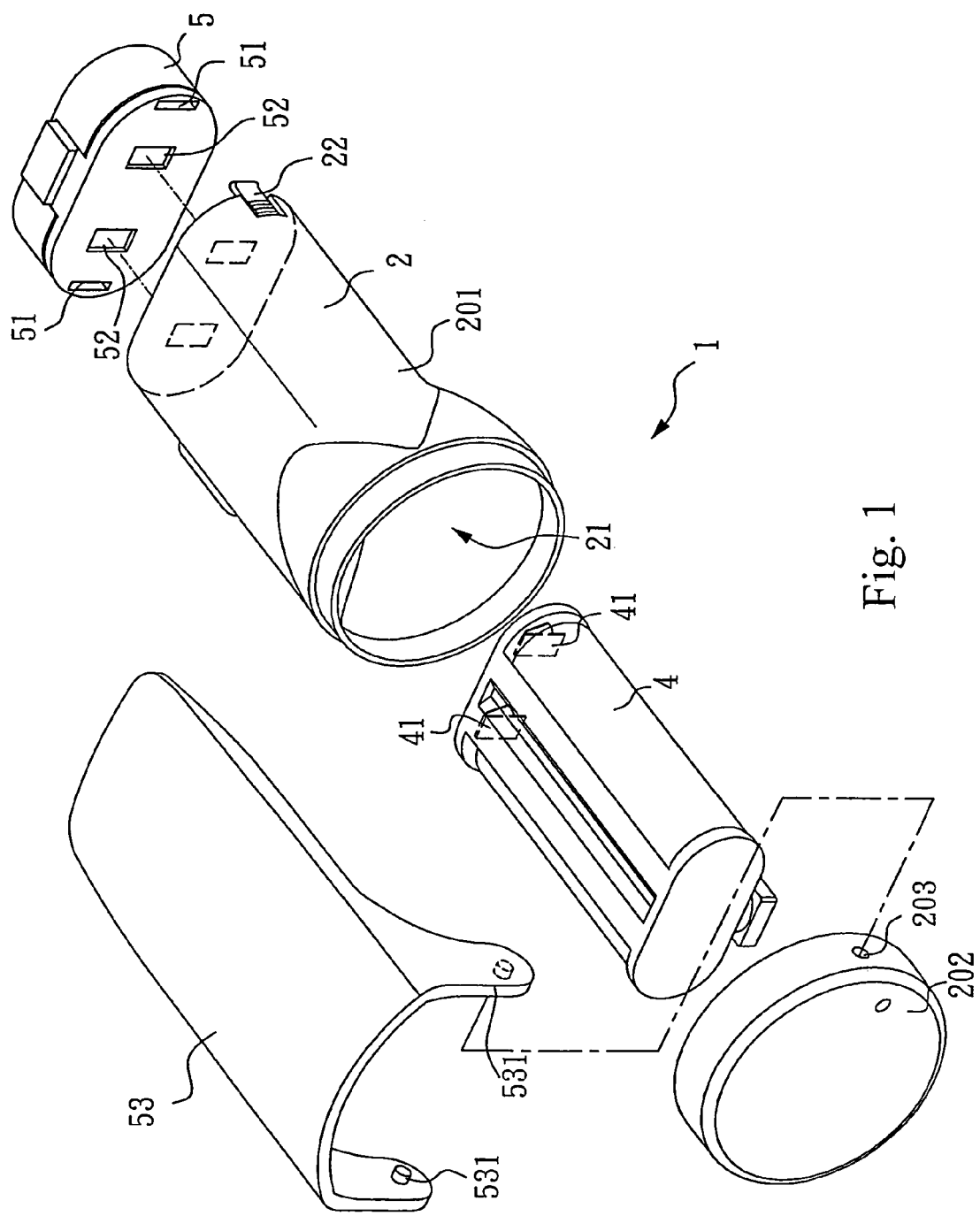
FIG. 1 is an exploded view of a combination of a power supply and a detachable electric implement according to the first embodiment of the present invention.

Referring to FIG. 1, a combination of power supply and detachable electric implement 1 in accordance with the first embodiment of the present invention is shown comprised of a housing 2, a power pack 4, and a detachable electric implement 5. The housing 2 includes a receiving chamber 21. The power pack 4 is mounted in the receiving chamber 21 inside the housing 2, having a set of terminals 41 exposed to the outside of the housing 2. The detachable electric implement 5 has a set of terminals 52 connectable to the set of terminals 41 of the power pack 4. Further, a first coupling device 22 is formed in one end of the housing 2, and a second coupling device 51 is formed in the detachable electric implement 5 and detachably coupled to the first coupling device 22 at the housing 2.

Referring to FIG. 1 again, the housing 1 is comprised of a body shell 201, having an elliptical body portion and a circular head portion wherein the circular head portion has a greater sectional dimension than that of the elliptical body portion, and a circular cover shell 202 with the circular head portion of the body shell 201 dimensioned correspondingly thereto so that the housing 1 can stand vertically and stably. The aforesaid receiving chamber 21 is formed in the body shell 201. The circular cover shell 202 is mounted on the circular head portion of the body shell 201 to close the receiving chamber 21. The power pack 4 is a battery case. The detachable electric implement 5 according to this embodiment is an electric sealing apparatus, having a handle 53. The handle 53 has two pivot pins 531 bilaterally disposed at one end and respectively pivoted to a respective pivot hole 203 in the circular cover shell 202. Further, according to this embodiment, the first coupling device 22 is comprised of two coupling hooks formed at external front sides of the body shell 201 and the second coupling device 51 is comprised of two hook holes adapted to receive the coupling hooks of the first coupling device 22. Alternatively, coupling hooks can be formed in the detachable electric implement 5, and hook holes can be formed in the housing 2 for receiving the coupling hooks.

Figure 2:
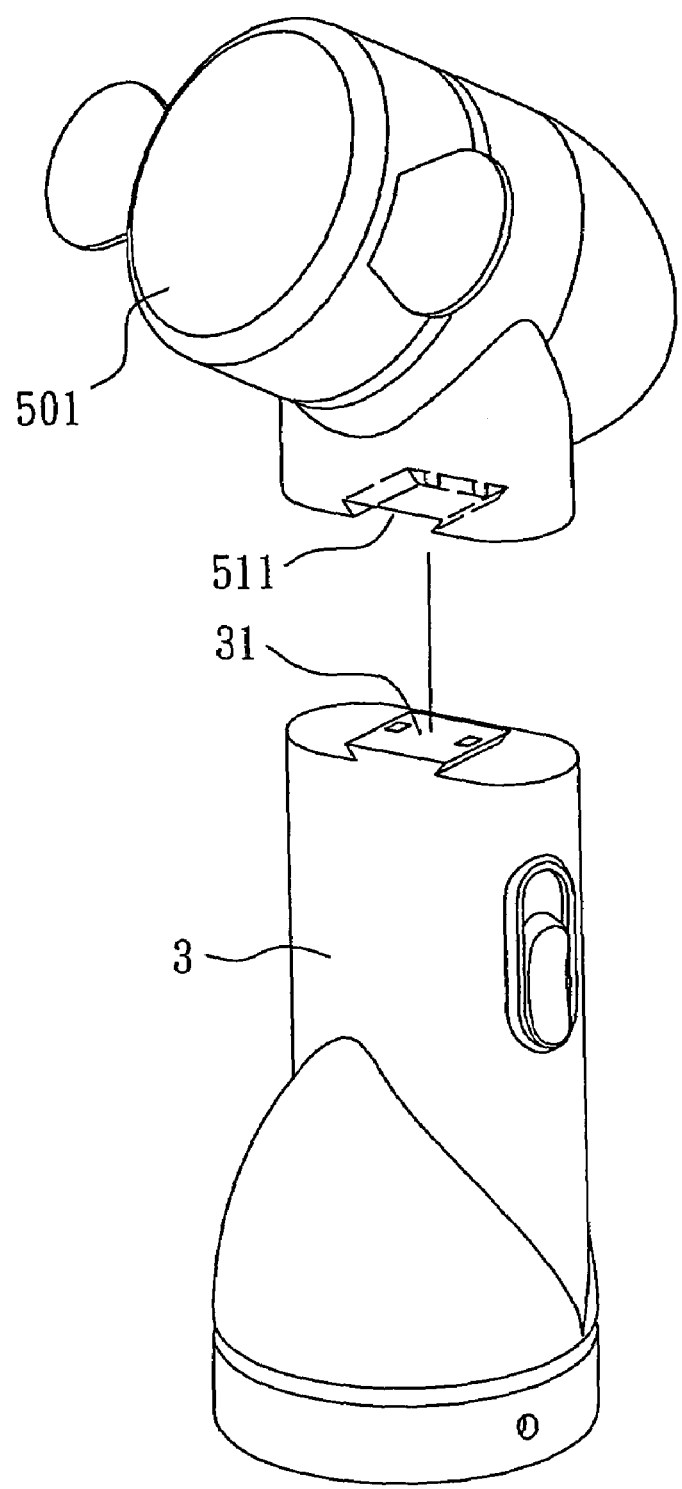
FIG. 2 is a perspective view of a combination of a power supply and a detachable electric implement according to the second embodiment of the present invention.

FIG. 2 is a perspective view of a combination power supply and detachable electric implement according to the second embodiment of the present invention. This second embodiment is substantially similar to the aforesaid first embodiment with the exception of the detachable electric implement. According to this embodiment, the detachable electric implement 501 is an electric fan. The second coupling device 511 that is formed in the electric fan 501 is a dovetail groove. The first coupling device 31 that is formed in the housing 3 is a dovetail tongue detachably coupled to the dovetail groove of the second coupling device 511 at the electric fan of the detachable electric implement 501.

Figure 3:
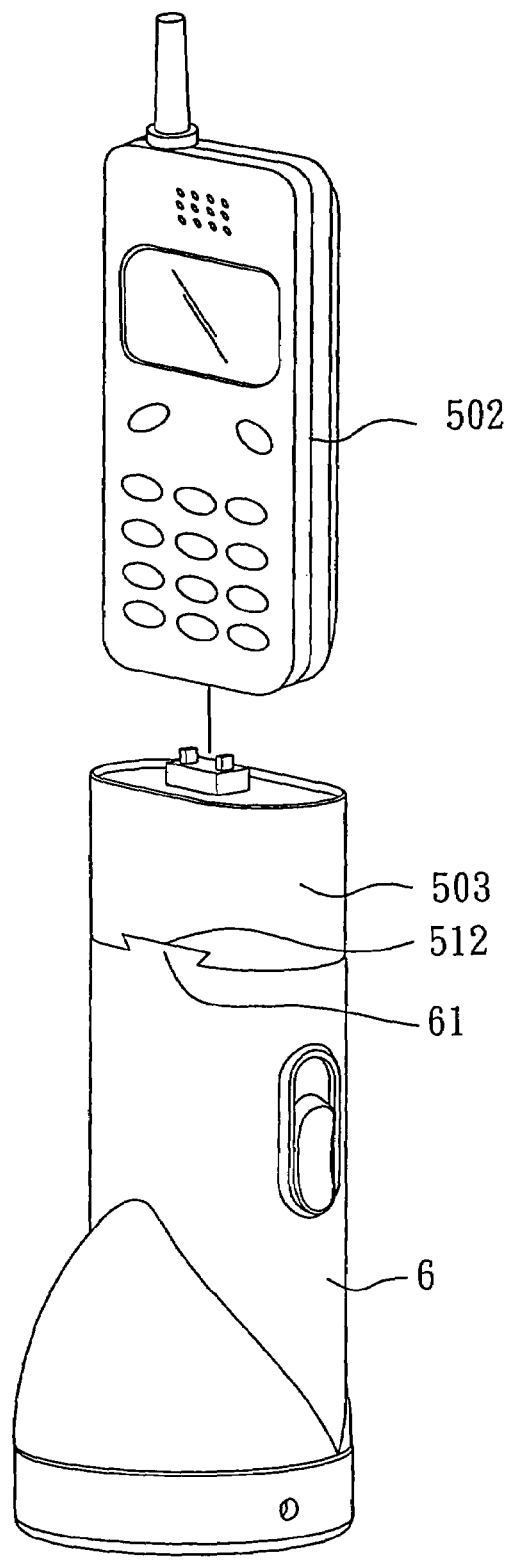
FIG. 3 is a perspective view of a combination of a power supply and a detachable electric implement according to the third embodiment of the present invention.

FIG. 3 is a perspective view of a combination power supply and detachable electric implement according to the third embodiment of the present invention. This third embodiment is substantially similar to the aforesaid first embodiment with the exception of the detachable electric implement. According to this embodiment, the detachable electric implement is a cellular telephone 502 having an adapter 503. The second coupling device, referenced by 512 is a dovetail groove formed in the adapter 503, and the first coupling device, referenced by 61 is a dovetail tongue formed in the housing, referenced by 6, and detachably coupled to the dovetail groove of the second coupling device 512.

Figure 4:
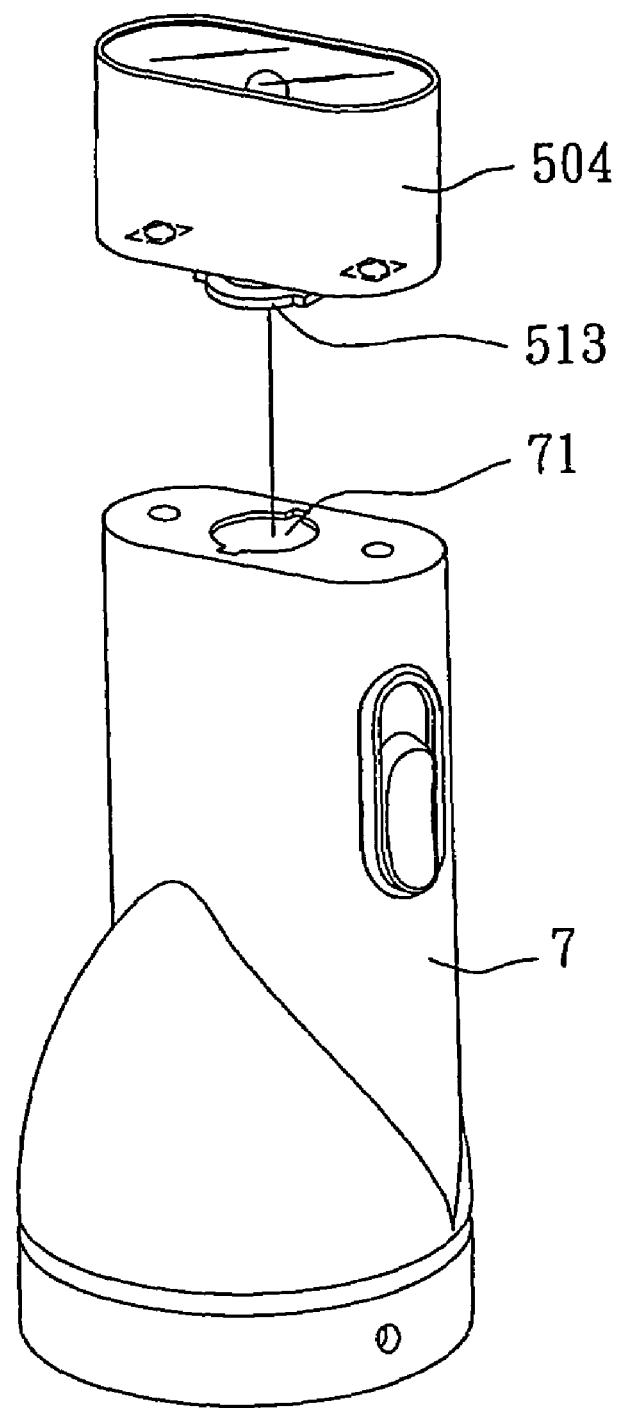
FIG. 4 is a perspective view of a combination of a power supply and a detachable electric implement according to the fourth embodiment of the present invention.

FIG. 4 is a perspective view of a combination power supply and detachable electric implement according to the fourth embodiment of the present invention. This fourth embodiment is substantially similar to the aforesaid first embodiment with the exception of the detachable electric implement. According to this embodiment, the detachable electric implement is a flash light, referenced by 504. The second coupling device 513 of the detachable electric implement 504 is a coupling neck, which is inserted into the first coupling device 71, which is a coupling hole in the housing 7, and then locked thereto when rotated in the coupling hole of first coupling device 71 through an angle.

Figure 5:
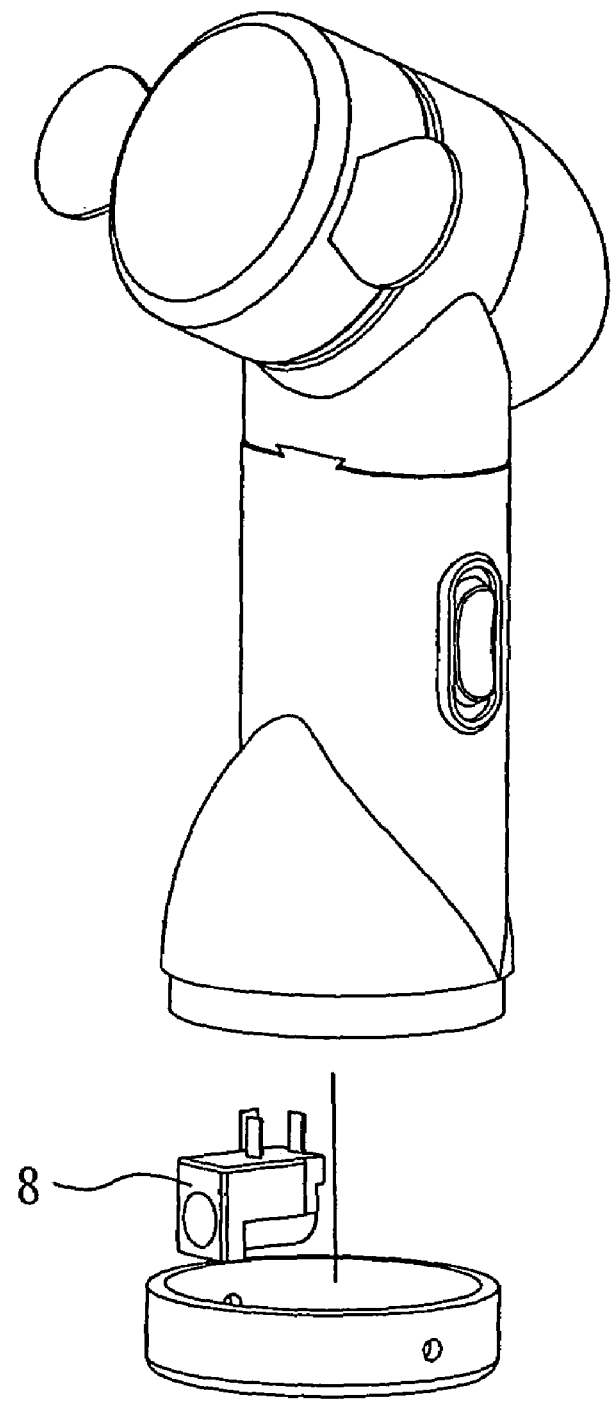
FIG. 5 is an exploded view of a combination a of power supply and a detachable electric implement according to the fifth embodiment of the present invention.

FIG. 5 is an exploded view of a combination power supply and detachable electric implement according to the fifth embodiment of the present invention. This fifth embodiment is substantially similar to the aforesaid first embodiment with the exception of the power pack. According to this embodiment, the power pack, referenced by 8 is a transformer connectable to an external power source, for example, an AC power supply. In general, the power pack of the combination of the power supply and detachable electric implement is not limited to the aforesaid battery case.

As indicated above, the detachable electric implement 5,501,502,504 is detachably coupled to the housing 2,3,6,7 by means of a detachable coupling structure, i.e., different detachable electric implements 5,501,502,504 can be selectively coupled to housing 2,3,6,7 carrying a power pack 4,8. By means of the application of the present invention, a power pack 4,8 can be selectively used of any of a variety of electric implements 5,501,502,504.

A prototype of the combination of the power supply and detachable electric implement has been constructed with the features of FIGS. 1~5. The combination of the power supply and the detachable electric implement functions smoothly to provide all of the features discussed earlier.

Although particular embodiments of the present invention have been described in detail for purposes of illustration, various modifications and enhancements may be made without departing from the scope of the invention. Accordingly, the invention is not to be limited except as by the appended claims.

What is claimed is:

1. A combination of a power supply and a detachable electric implement,
   a housing, said housing defining a receiving chamber, and including a body shell and a circular cover shell, wherein the body shell has an elliptical body portion and a circular head portion dimensioned correspondingly to and for mounting the circular cover shell so as to close the receiving chamber, and wherein the circular head portion has a greater sectional dimension than that of the elliptical body portion;
   a power pack mounted in said receiving chamber inside said housing, said power pack having power terminal means exposed outside said housing;
   an electric implement, said electric implement having power terminal means connectable to the power terminal means of said power pack to obtain the necessary working electric power from said power pack; and
   an open and replaceable coupling pair including a first coupling means implemented on said housing and a second coupling means implemented on said electric implement and detachably coupled to the first coupling means for fastening to said first coupling means to secure said electric implement to said housing and for keeping the power terminal means of said electric implement in contact with the power terminal means of said power pack.

2. The combination of a power supply and a detachable electric implement as claimed in claim 1, wherein said power pack is a battery case.

3. The combination of a power supply and a detachable electric implement as claimed in claim 1, further comprising a handle having two pivot pins bilaterally disposed at one end and respectively pivoted to a respective pivot hole on the circular cover shell of said housing when said electric implement is an electric sealing apparatus.

4. The combination of a power supply and a detachable electric implement as claimed in claim 3, wherein said first coupling means is comprised of at least one hook formed at an external front side of the elliptical body portion of the body shell, and said second coupling means is comprised of at least one hook hole adapted to receive the at least one hook of said first coupling means when said electric implement is the electric sealing apparatus.

5. The combination of a power supply and a detachable electric implement as claimed in claim 1, wherein said electric implement is a cellular telephone, said cellular telephone having an adapter, said adapter having a part forming said second coupling means.

6. The combination of a power supply and a detachable electric implement as claimed in claim 5, wherein, when said electric implement is the cellular telephone, said first coupling means is a dovetail tongue, and said second coupling means is a dovetail groove adapted to receive said dovetail tongue.

7. The combination of a power supply and a detachable electric implement as claimed in claim 1, wherein said power pack is a transformer connected to an external power source.

8. The combination of a power supply and a detachable electric implement as claimed in claim 7, wherein said external power source is an AC power supply.

9. The combination of a power supply and a detachable electric implement as claimed in claim 1, wherein, when said electric implement is an electric fan, said first coupling means is a dovetail tongue, and said second coupling means is a dovetail groove adapted to receive said dovetail tongue.

10. The combination of a power supply and a detachable electric implement as claimed in claim 1, wherein, when said electric implement is a flash light, said first coupling means is a coupling hole, and said second coupling means is a coupling neck adapted to insert into said coupling hole.

* * * * *